United States Patent
Chang et al.

(10) Patent No.: US 8,049,703 B2
(45) Date of Patent: Nov. 1, 2011

(54) FLAT DISPLAY STRUCTURE AND METHOD FOR DRIVING FLAT DISPLAY

(75) Inventors: Lee-Hsun Chang, Yunlin County (TW); Yu-Wen Lin, Dali (TW); Chung-Lung Li, Taipei (TW); Yung-Tse Cheng, Fongshan (TW)

(73) Assignee: AU Optronics Corp., Hsin-Chu (TW)

( * ) Notice: Subject to any disclaimer, the term of this patent is extended or adjusted under 35 U.S.C. 154(b) by 962 days.

(21) Appl. No.: 11/482,732

(22) Filed: Jul. 10, 2006

(65) Prior Publication Data

US 2007/0171172 A1 Jul. 26, 2007

(30) Foreign Application Priority Data

Jan. 26, 2006 (TW) .............................. 95103162 A (51) Int. Cl.
*G09G 3/36* (2006.01)
(52) U.S. Cl. ............. 345/99; 345/98; 345/100; 345/204

(58) Field of Classification Search ................... 345/99, 345/100, 204, 98
See application file for complete search history.

(56) References Cited

U.S. PATENT DOCUMENTS

| 6,862,013 B2 * | 3/2005 | Takeuchi et al. ................ 345/92 |
| 2004/0041774 A1 * | 3/2004 | Moon ............................. 345/99 |

* cited by examiner

*Primary Examiner* — Alexander Eisen
*Assistant Examiner* — Viet Pham
(74) *Attorney, Agent, or Firm* — Bacon & Thomas, PLLC (57) ABSTRACT

A flat display structure including a substrate, a pixel matrix, a driving circuit and several voltage adapting devices and driving method thereof are provided. Each of voltage adapting devices includes an input terminal, a first control terminal and an output terminal. The input terminal is electrically connected to the i-th gate line $G_i$ corresponding to the i-th pixel row $R_i$. The first control terminal is adapted to receive a first control signal. The output terminal is adapted to receive a working voltage.

20 Claims, 8 Drawing Sheets

FLAT DISPLAY STRUCTURE AND METHOD FOR DRIVING FLAT DISPLAY

This application claims the benefit of Taiwan application Serial No. 95103162, filed Jan. 26, 2006, the subject matter of which is incorporated herein by reference.

BACKGROUND OF THE INVENTION

1. Field of the Invention

The invention relates in general to a flat display and driving method thereof, and more particularly to a flat display structure using a voltage adapting device to input a working voltage to a gate line and driving method thereof.

2. Description of the Related Art

In a conventional large-scaled glass on array (GOA) liquid crystal display (LCD), the gate line has a high loading charge, so the gate signal is likely to be coupled with the clock signal of the driving circuit, resulting in the problems of gate signal distortion and gate delay. To resolve the coupling and distortion problems, a pull down circuit is disposed on each gate line to improve the display quality.

Figure 1:
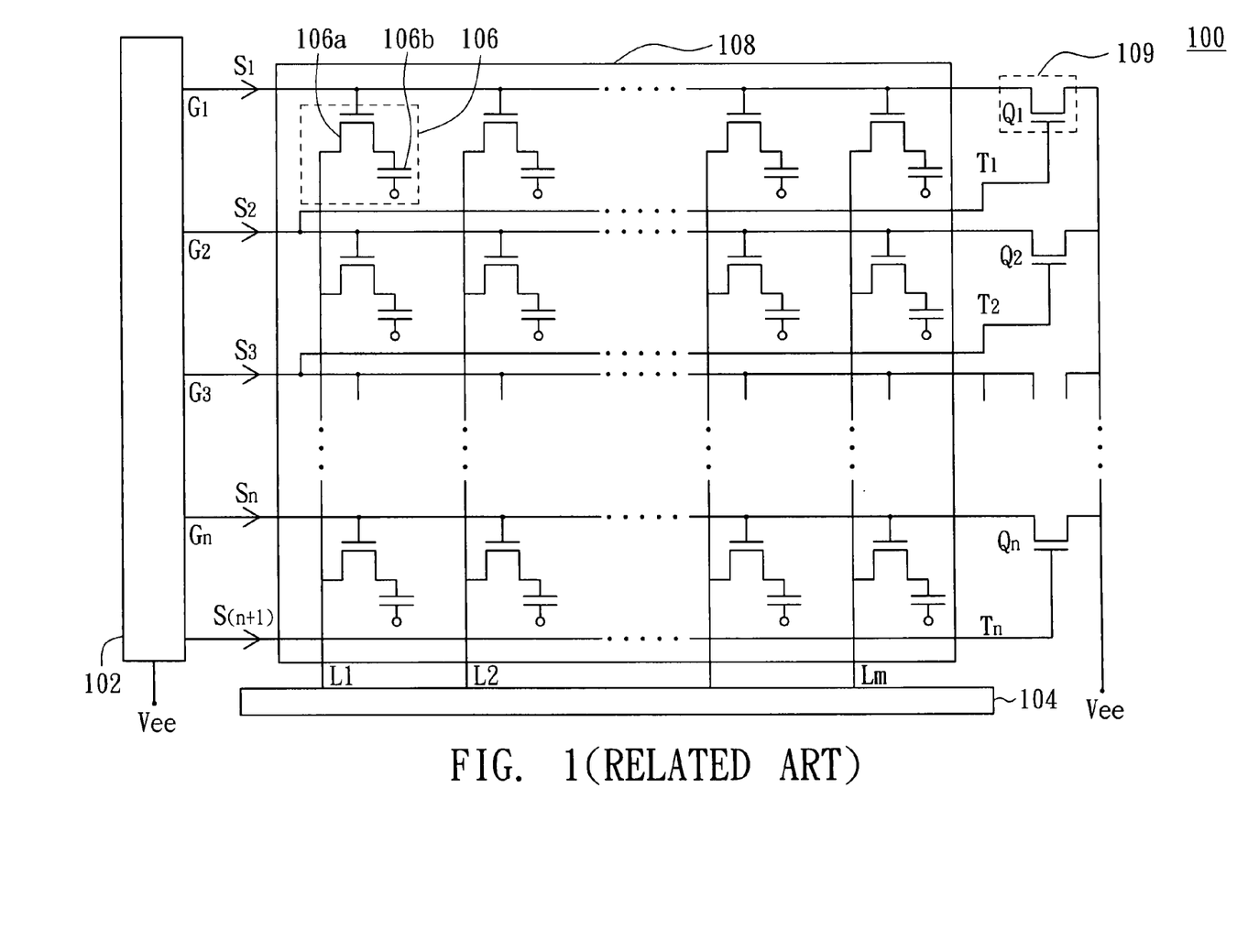
FIG. 1 shows a partial structure of a conventional GOA liquid crystal display equipped with a pull down circuit.

Referring to FIG. 1, partial structure of a conventional GOA liquid crystal display equipped with a pull down circuit is shown. The liquid crystal display 100 includes a scan driving circuit 102, a data driving circuit 104, a pixel matrix 108 consisting of a number of pixels 106, and n pull down circuits 109. The pull down circuit 109 includes N-type metal oxide semiconductor (NMOS) transistors Q1~Qn, n is a positive integer.

When the scan driving circuit 102 sequentially outputs n gate signals S1~Sn through n gate lines G1~Gn to the pixels 106 on each row to turn on the thin film transistor (TFT) 106a of each pixel 106, the data driving circuit 104 outputs a data signal through m data lines L1~Lm and charges the pixel electrode 106b of each pixel 106 through the TFT transistor 106a, so that the liquid crystal molecules are rotated to display corresponding pixel images.

Furthermore, as shown in FIG. 1, the NMOS transistors Q1~Qn are disposed outside the pixel matrix 108. The drains of the NMOS transistors Q1 Qn are respectively coupled to the tail ends of the gate lines G1 Gn. The sources of the NMOS transistors Q1~Qn are coupled to a low level working voltage Vee of the scan driving circuit 102. The gates of the NMOS transistor Q1~Q(n−1) are respectively coupled to the front end of the next gate lines G2~Gn through (n−1) transmission lines T1~T(n−1), and the gate of the NMOS transistor Qn is coupled to the scan driving circuit 102 through the transmission line Tn. By doing so, the scan driving circuit 102 outputs the gate signal Sn to turn on the corresponding $n^{th}$ row pixel 106 through the gate line Gn for example; and during the next timing period, the scan driving circuit 102 turns on the NMOS transistor Qn by using the high level gate signal S(n+1) outputted by the transmission line Tn so that the gate signal Sn is promptly boosted to Vee level. The remaining gate signals S1~S(n−1) can use the NMOS transistors Q1~Q(n−1) to achieve the same function. Thus, the above problems of gate delay and signal distortion are resolved.

Despite the conventional liquid crystal display 100 can improve the gate delay by using the NMOS transistors Q1~Qn, however, in terms of structure, the transmission lines T1~Tn disposed according to the disposition of the NMOS transistors Q1~Qn have to pass through the pixel matrix 108, significantly decreasing the aperture ratio of each pixel 106 of the pixel matrix 108. Besides, when the scale of the liquid crystal display 100 is enlarged, the accompanied loading effect will cause significant ripple effect to the gate signals S1~Sn. However, within the display time of one frame, each of the NMOS transistors Q1~Qn is only turned on once and is incapable of decreasing the ripples generated when the NMOS transistor is not turned on, largely affecting the display quality.

SUMMARY OF THE INVENTION

Therefore, how to resolve the problems of gate delay, signal distortion and ripples without affecting the aperture ratio is an imminent goal to be achieved.

It is therefore an object of the invention to provide a flat display structure and method for driving a flat display. After each gate line outputs a gate signal to turn on the corresponding pixel row, the driving circuit of the flat display turns on each voltage adapting device, which is coupled to the gate line and disposed on the substrate, to output a working voltage of the driving circuit to the corresponding gate line and promptly adjusts the gate signal to a predetermined level. Consequently, gate delay and signal distortion are decreased without affecting the aperture ratio, hence largely improving the display quality.

The invention achieves the above-identified object by providing a flat display structure including a substrate, a number of gate lines and data lines, a driving circuit and a number of voltage adapting devices. The gate lines and data lines are disposed on the substrate and together form a pixel matrix having a number of pixel rows. The driving circuit is electrically connected to the gate lines. The voltage adapting devices are disposed on the substrate. Each of the voltage adapting devices includes an input terminal, a first control terminal and an output terminal. The input terminal is electrically connected to the corresponding gate line, the first control terminal is adapted to receive a first control signal, and the output terminal is adapted to receive a working voltage.

The invention further achieves the above-identified object by providing a method for driving a flat display. The flat display includes a pixel matrix having a number of pixel rows. The method includes the steps of sequentially providing a first gate signal to the j-th pixel row Rj and the (j+1)-th pixel row Rj+1 according to a first clock signal and a second clock signal, respectively, in a first display period, wherein the first clock signal and the second closk signal are out of phase and have same frequency; providing a first control signal to the j-th pixel row Rj and the (j+1)-th pixel row Rj+1, respectively, wherein the first control signal to the j-th pixel row Rj and the first control signal to the (j+1)-th pixel row Rj+1 are out of phase and have same frequency, and the first control signal to the j-th pixel row Rj and the first clock signal are out of phase and have same frequency; and providing a working voltage to the j-th pixel row Rj and the (j+1)-th pixel row Rj+1, wherein the first gate signal is adjusted according to the first control signal and the working voltage.

Other objects, features, and advantages of the invention will become apparent from the following detailed description of the preferred but non-limiting embodiments. The following description is made with reference to the accompanying drawings.

DETAILED DESCRIPTION OF THE INVENTION

According to the design of the invention, a driving circuit is used to output a gate signal to turn on the pixel row of the gate line first and outputs a control signal to turn on the voltage adapting device which is disposed on the substrate and coupled to the gate lines, so that a working voltage of the driving circuit is outputted to the gate lines and that the gate signals is promptly adjusted to a predetermined level, thereby decreasing the gate delay and distortion of gate signals. The control signal is outputted to the voltage adapting device through the transmission line disposed on some area of the substrate other than the pixel matrix to avoid affecting the aperture ratio. Besides, the control signal can control the voltage adapting device to continuously output the working voltage within the display time of a frame so as to largely decrease the ripples generated due to the coupling of gate signals.

As for how the driving circuit uses the control signal to control the voltage adapting device to achieve the above objects is exemplified by two embodiments disclosed below. However, the scope of the invention is not limited thereto.

First Embodiment

Figure 2:
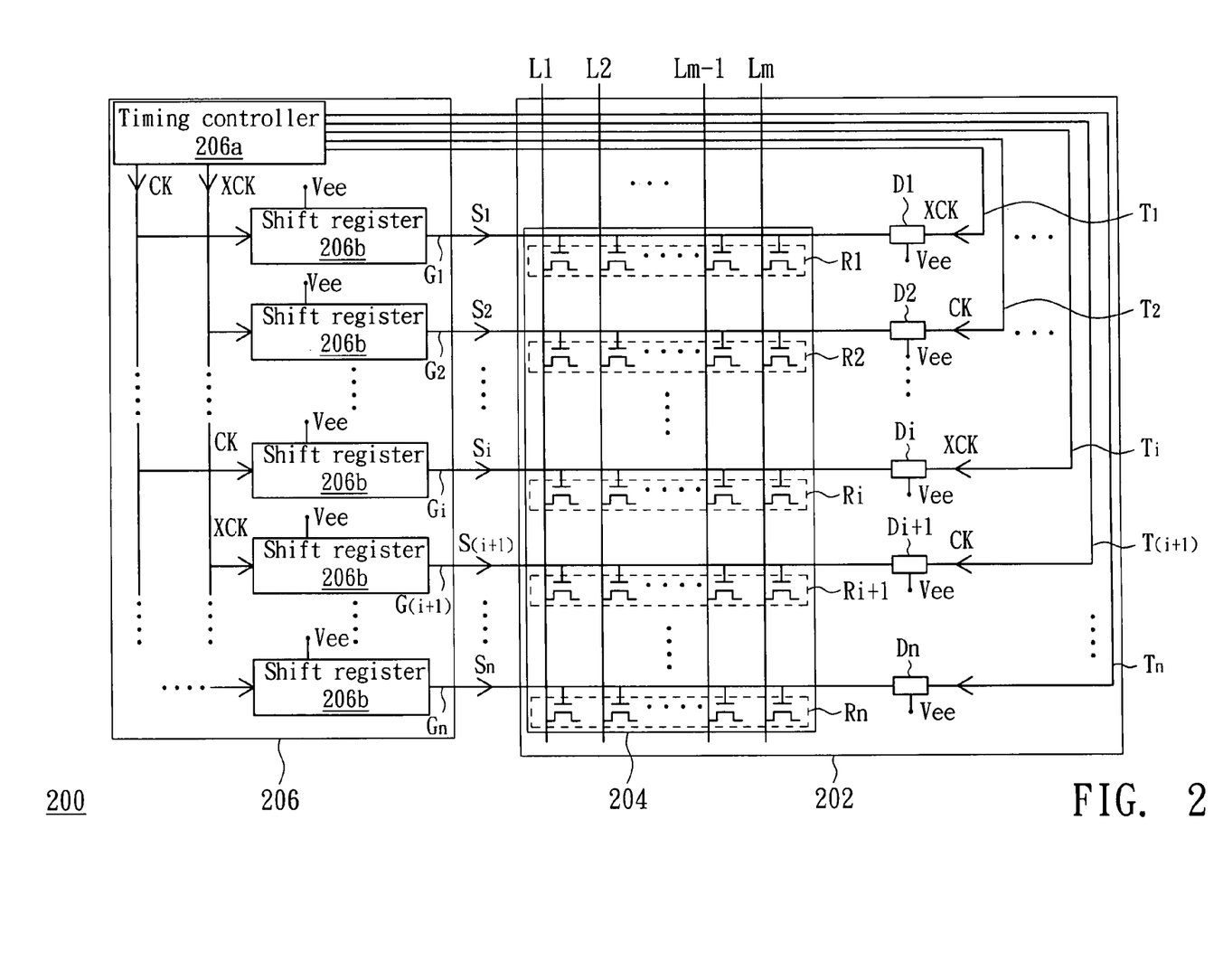
FIG. 2 shows the circuit structure of a flat display according to a first embodiment of the invention.

Referring to FIG. 2, the circuit structure of a flat display according to a first embodiment of the invention is sown. Examples of the flat display 200 includes a substrate 202, gate lines G1~Gn, data lines L1~Lm, a driving circuit 206 and n voltage adapting devices Dj (j=1~n), wherein n is a positive integer. As shown in FIG. 2, the gate lines G1~Gn and the data lines L1~Lm are disposed on the substrate 202 and together form a pixel matrix 204 which includes n pixel rows Ri, i=1~n.

The driving circuit 206 further includes a timing controller 206a and n shift registers 206b. The n shift registers 206b sequentially outputs gate signals S1~Sn through the gate lines G1~Gn to enable each pixel row Ri according to the clock signals CK and XCK outputted by the timing controller 206a. The phase of the XCK signal is reverse to the phase of the CK signal.

As shown in FIG. 2, the first transmission lines T1~Tn are disposed on some area of the substrate 202 other than the pixel matrix 204. The timing controller 206a of the driving circuit 206 respectively outputs a first control signal, such as the clock signal XCK or CK, through the transmission lines T1~Tn. The first control signal applied to the j-th voltage adapting device $D_j$ and the first control signal applied to the (j+1)-th voltage adapting device $D_{j+1}$ are out of phase and have same frequency. Each voltage adapting device Dj is disposed on some area of the substrate 202 other than the pixel matrix 204 and is coupled to the corresponding gate line Gj and the transmission line Tj.

Figure 3:
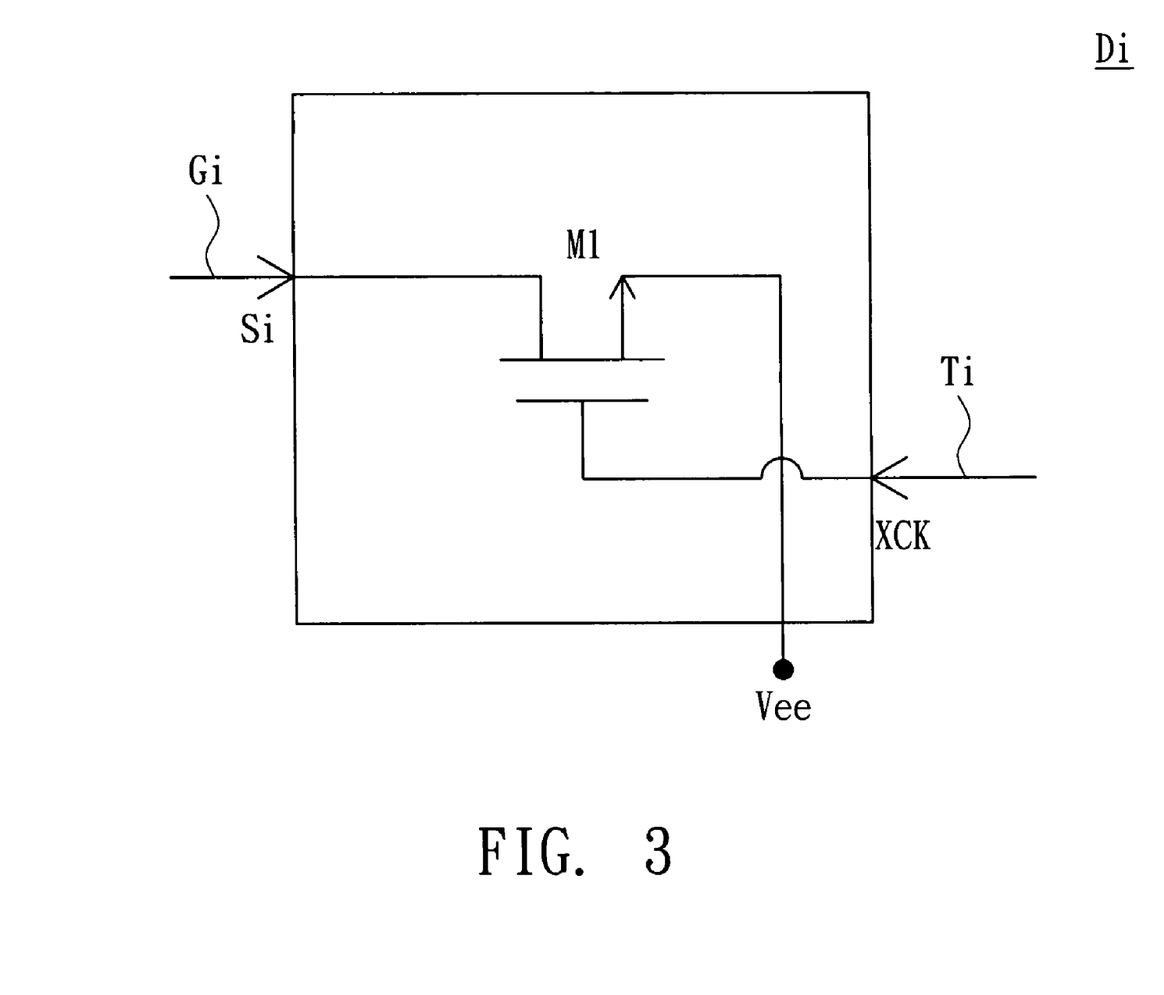
FIG. 3 shows the structure of a voltage adapting device according to the first embodiment of the invention.

Referring to FIG. 3, the structure of a voltage adapting device Di according to the first embodiment of the invention is shown. The voltage adapting device Di includes a first switch, such as an NMOS transistor M1. As shown in FIG. 3, the NMOS transistor M1 includes an input terminal (the drain), a first control terminal (the gate), and an output terminal (the source). The input terminal of the NMOS transistor M1 is coupled to the corresponding gate line Gi, the first control terminal of the NMOS transistor M1 is coupled to the corresponding transmission line Ti to receive a first control signal, such as the clock signal XCK, and the output terminal of the NMOS transistor M1 is coupled to a low-level working voltage Vee.

Figure 4A:
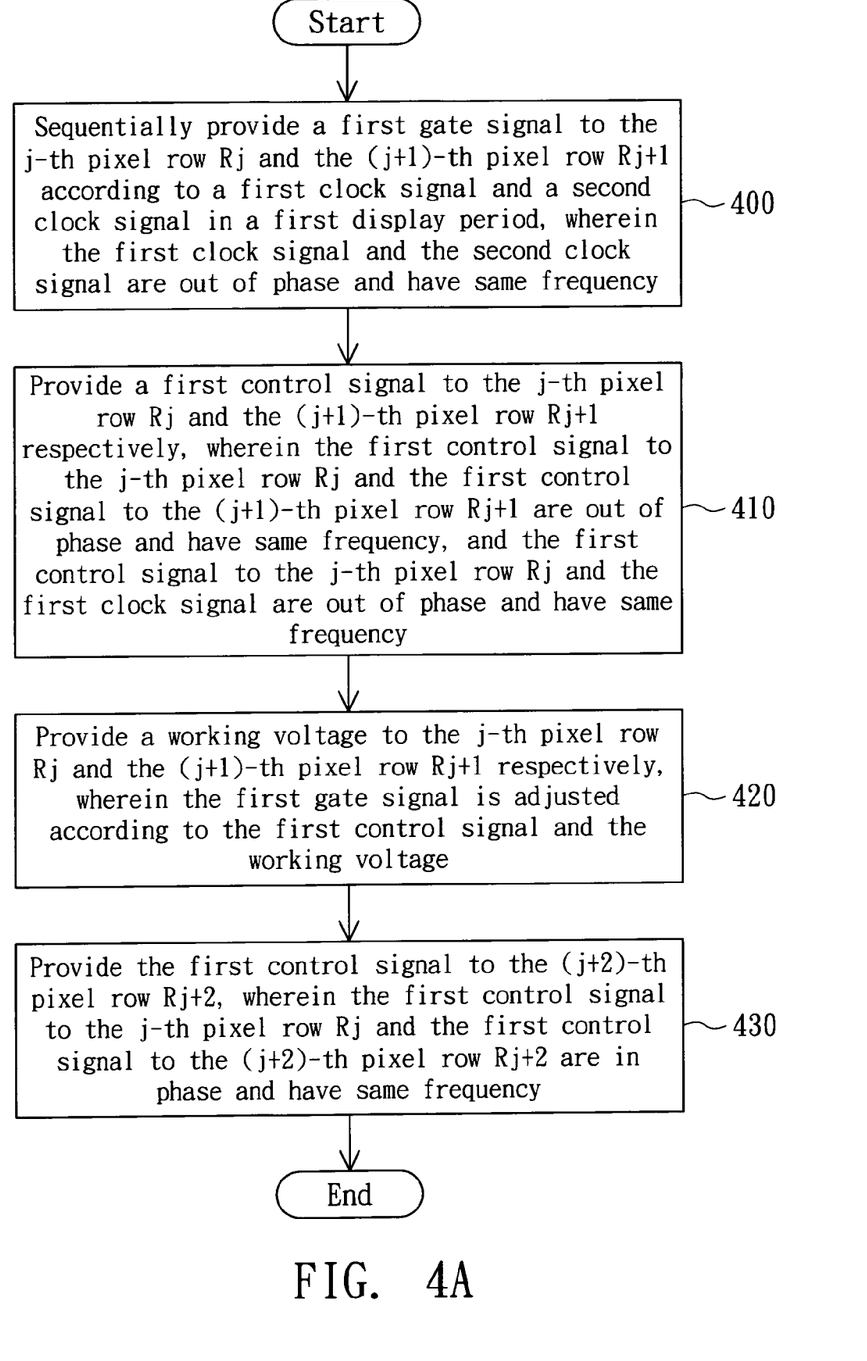
FIG. 4A is a flow chart of a method for driving the display panel according to the first embodiment of the invention.

Referring to FIG. 4A, a flow chart of a method for driving the flat display 200 according to the first embodiment of the invention is shown. First, in step 400, sequentially provide a first gate signal, such as Sj and Sj+1, to the j-th pixel row $R_j$ and the (j+1)-th pixel row $R_{j+1}$ according to a first clock signal and a second clock signal, respectively, in a first display period (t1 and t2), wherein the first clock signal and the second closk signal, such as the clock signals CK and XCK, are out of phase and have same frequency.

Following that, in step 410, provide a first control signal, such as the clock signals XCK and CK, to the j-th pixel row $R_j$ and the (j+1)-th pixel row $R_{j+1}$, respectively, in the periods t1 and t2, wherein the first control signal (XCK) provided to the j-th pixel row $R_j$ and the first control signal (CK) provided to the (j+1)-th pixel row $R_{j+1}$ are out of phase and have same frequency, and the first control signal (XCK) to the j-th pixel row $R_j$ and the first clock signal (CK) are out of phase and have same frequency. Next, in step 420, provide a working voltage, such as Vee, to the j-th pixel row $R_j$ and the (j+1)-th pixel row $R_{j+1}$, respectively in the periods t1 and t2, wherein the first gate signal Sj (and/or Sj+1) is adjusted according to the first control signal XCK (CK) and the working voltage Vee. Finally, in step 430, provide the first control signal, such as the clock signal XCK, to the (j+2)-th pixel row $R_{j+2}$, in the next period, wherein the first control signal (XCK) provided to the j-th pixel row $R_j$ and the first control signal (XCK) provided to the (j+2)-th pixel row $R_{j+2}$ are in phase and have same frequency.

Figure 4B:
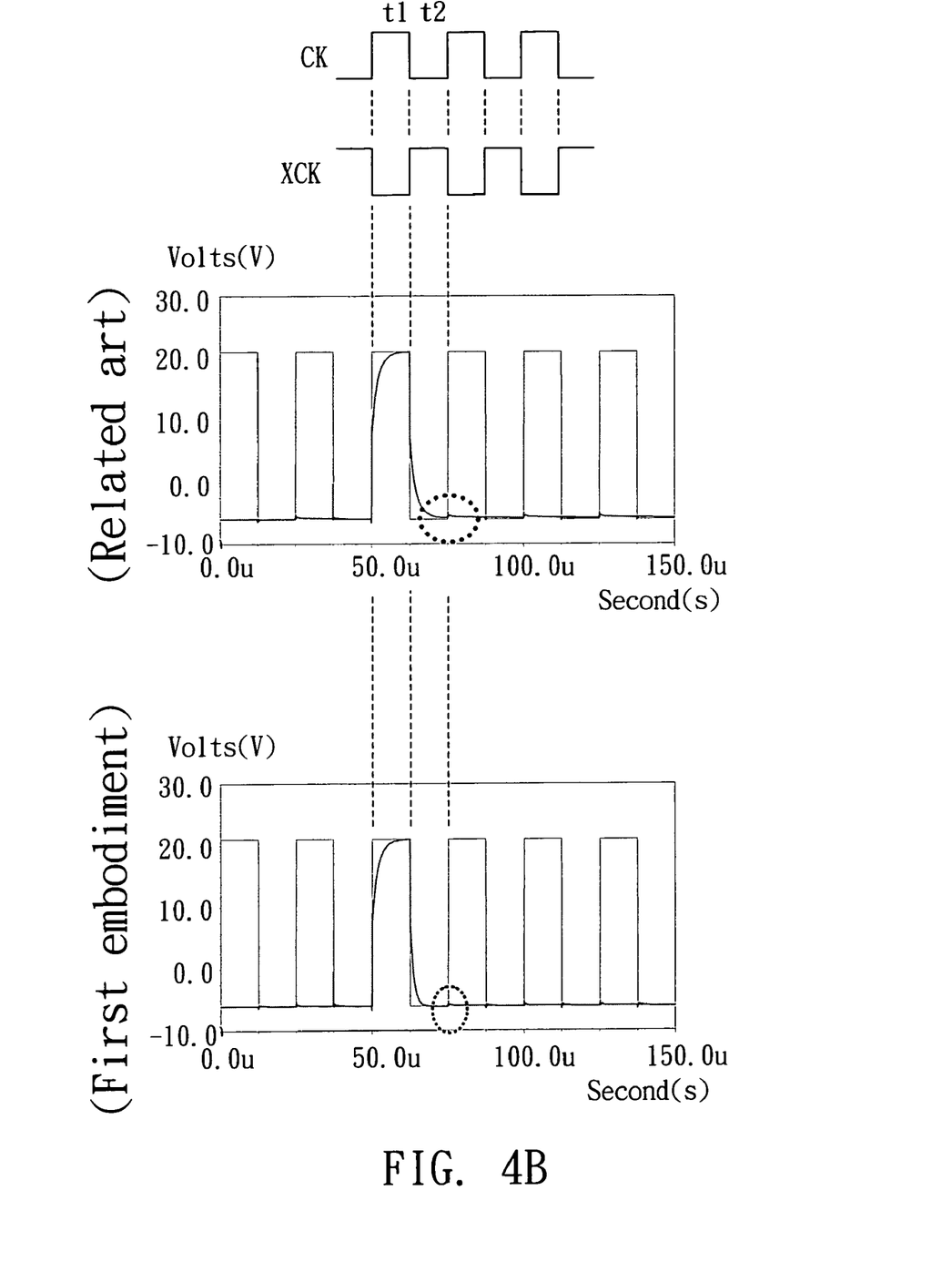
FIG. 4B shows a comparison diagram of the gate signal waveforms according to the related art and the first embodiment of the invention.

Referring to FIG. 4B, a comparison diagram of the gate signal waveforms according to the related art and the first embodiment of the invention is shown. In the driving circuit 206, the $i^{th}$ and the $(i+1)^{th}$ shift registers 206b, which respectively correspond to the gate lines Gi and G(i+1), function according to the clock signal CK and the clock signal XCK. The first control signals of the NMOS transistor M1 corresponding to the gate lines Gi and G(i+1) are the clock signals XCK and CK, respectively.

As shown in FIG. 3 and FIG. 4B, during a first period t1, that is, within 12.5 microseconds (us), the clock signal CK is at high level, the $i^{th}$ shift register 206b outputs a gate signal Si through the gate line Gi to enable the corresponding pixel row Ri. The timing controller 206a outputs a first control signal, that is, the clock signal XCK, to turn off the NMOS transistor M1 coupled to the gate line Gi. Meanwhile, the $(i+1)^{th}$ shift register 206b provides the gate line G(i+1) with an output voltage according to the working voltage Vee to disable the corresponding pixel row Rj+1.

Next, during a second period t2, the $(i+1)^{th}$ shift register 206b outputs a gate signal S(i+1) through the gate line G(i+1) to enable the corresponding pixel row Rj+1 according to a high-level clock signal XCK. Meanwhile, the timing controller 206a outputs a first control signal, that is, the clock signal XCK, to turn on the NMOS transistor M1 coupled to the gate line Gi for outputting the working voltage Vee to the gate line Gi.

Thus, as shown in FIG. 4B, the gate delay time according to related art equals 3.21 us, and the magnitude of the circled ripples equals 0.62V. The gate delay time according to the first embodiment of the invention equals 1.76 us, and the magnitude of the circled ripples equals 0.34V. That is, according to the design of the invention, during the second period t2, the gate delay of the gate signal Si inputted during the first period t1 is reduced because the working voltage Vee outputted by the turned-on NMOS transistor M1 promptly lowers down the gate signal Si to the low level.

Moreover, the ripples, which start to occur during the second period t2 are also decreased. The first control signal is outputted to the NMOS transistor M1 of the corresponding voltage adapting device Di through the transmission line Ti disposed outside the pixel matrix 204 to avoid affecting the aperture ratio. Meanwhile, within the display time of one frame, the first control signal turns on the NMOS transistor M1 at an interval of the first period t1 to continuously output the working voltage Vee. The invention is capable of reducing the gate delay issue without affecting the aperture ratio and thus decreasing ripples by outputting the working voltage Vee to the corresponding gate line at a fixed time interval according to the duty cycle of the first control signal.

Second Embodiment

The second embodiment differs with the first embodiment in that the driving circuit 206 further outputs a number of second control signals such as the clock signal XCK or CK to the voltage adapting devices D1~Dn through second transmission lines T1'~Tn' disposed on some area of the substrate 202 other than the pixel matrix 204. The voltage adapting device Di is coupled to the corresponding second transmission line Ti.

Figure 5:
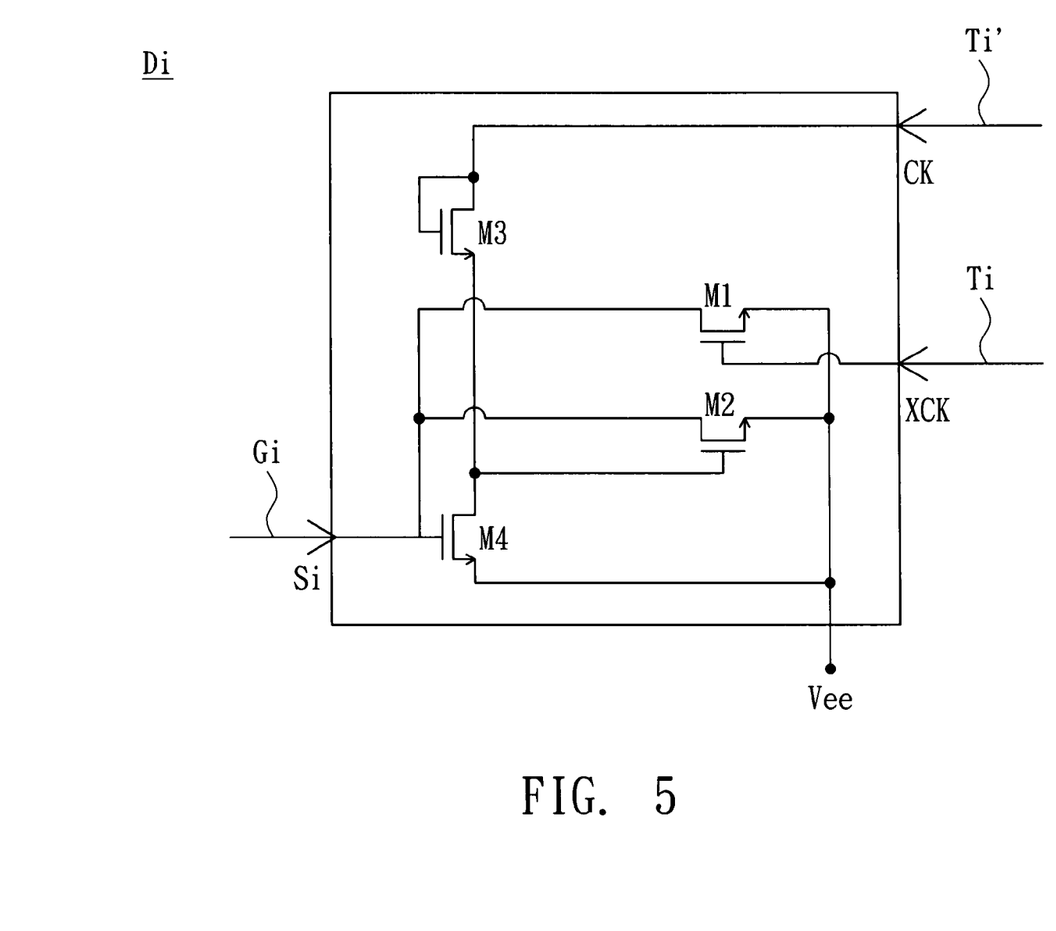
FIG. 5 shows the structure of a voltage adapting device according to a second embodiment of the invention.

Referring to FIG. 5, the structure of a voltage adapting device Di according to a second embodiment of the invention is shown. The flat display structure in the present invention discussed herein means layouts or circuits within the flat panel. As shown in FIG. 5, the voltage adapting device Di includes NMOS transistors M1, M2, M3 and M4. The drain of the NMOS transistor M2 is coupled to the corresponding gate line Gi, and the source of the NMOS transistor M2 is coupled to the working voltage Vee. The drain of the NMOS transistor M3 is coupled to the second transmission line Ti' to receive the corresponding second control signal, such as the clock signal CK, the gate and the drain of the NMOS transistor M3 are coupled together, and the source of the NMOS transistor M3 is coupled to the gate of the NMOS transistor M2. The drain of the NMOS transistor M4 is coupled to the gate of the transistor M2, the gate of the NMOS transistor M4 is coupled to the corresponding gate line Gi, and the source of the NMOS transistor M4 is coupled to the working voltage Vee.

Figure 6A:
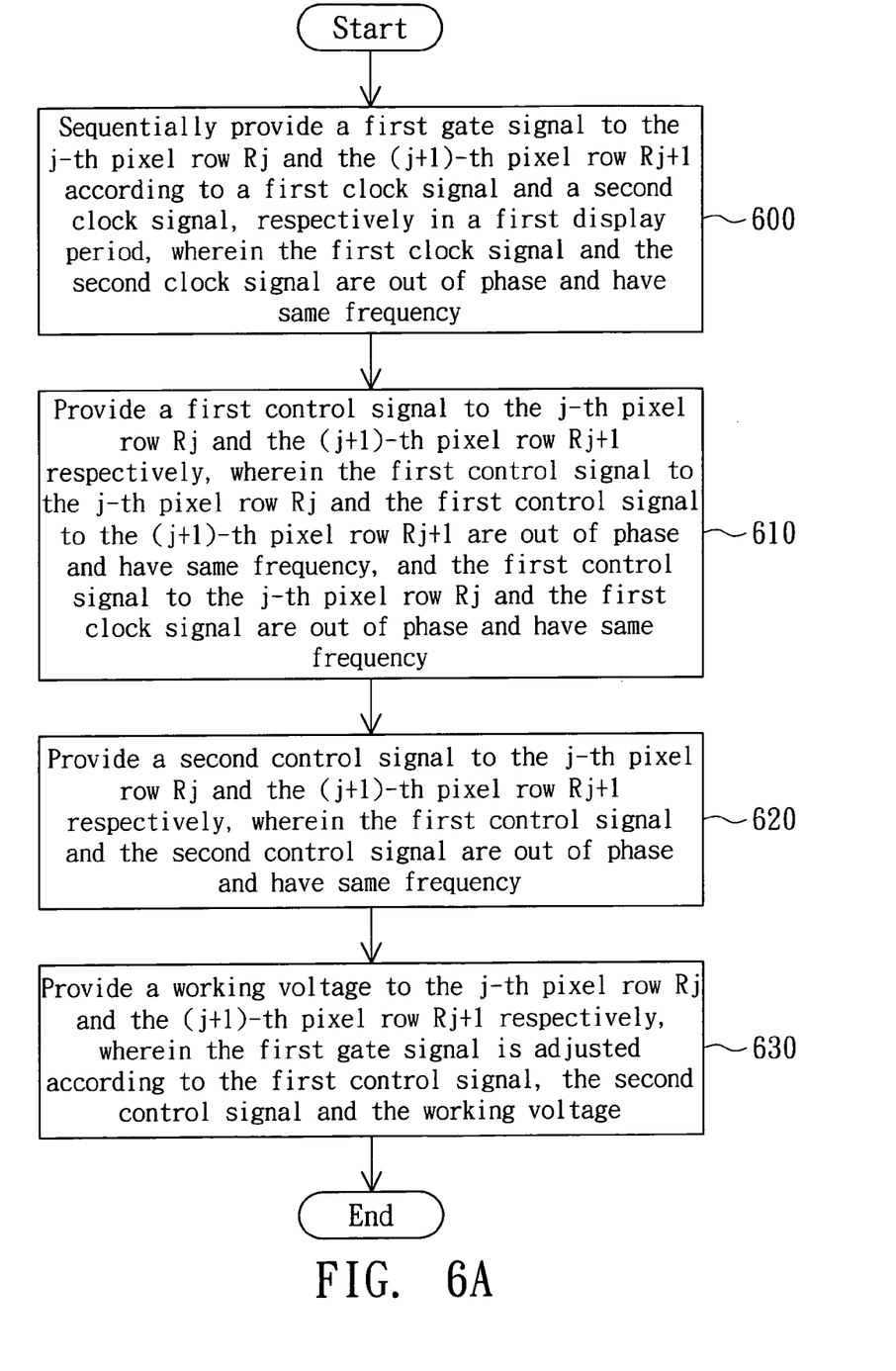
FIG. 6A is a flow chart of a method for driving the display panel according to the second embodiment of the invention.

Referring to FIG. 6A, a flow chart of a method for driving the flat display 200 according to the second embodiment of the invention is shown. First, in step 600, sequentially provide a first gate signal, such as Sj and Sj+1, to the j-th pixel row $R_j$ and the (j+1)-th pixel row $R_{j+1}$ according to a first clock signal and a second clock signal, respectively, in a first display period (t1 and t2), wherein the first clock signal and the second closk signal, such as the clock signals CK and XCK, are out of phase and have same frequency.

Following that, in step 610, provide a first control signal, such as the clock signals XCK and CK, to the j-th pixel row $R_j$ and the (j+1)-th pixel row $R_{j+1}$, respectively, in the periods t1 and t2, wherein the first control signal (XCK) provided to the j-th pixel row $R_j$ and the first control signal (CK) provided to the (j+1)-th pixel row $R_{j+1}$ are out of phase and have same frequency, and the first control signal (XCK) to the j-th pixel row $R_j$ and the first clock signal (CK) are out of phase and have same frequency. Next, in step 620, provide a second control signal, such as the clock signals CK and XCK, to the j-th pixel row $R_j$ and the (j+1)-th pixel row $R_{j+1}$, respectively in the periods t1 and t2, wherein the first control signal (XCK or CK) and the second control signal (CK or XCK) are out of phase and have same frequency.

Finally, in step 630, provide a working voltage, such as Vee, to the j-th pixel row $R_j$ and the (j+1)-th pixel row $R_{j+1}$, respectively in the periods t1 and t2, wherein the first gate signal Sj (and/or Sj+1) is adjusted according to the first control signal XCK (CK), the second control signal CK (XCK) and the working voltage Vee.

The second embodiment is exemplified by using the driving circuit 206 of FIG. 2 including a timing controller 206a and shift registers 206b. The timing controller 206a is coupled to the second transmission lines T1'~Tn' (not illustrated in FIG. 2), and is used for outputting the second control signals through the transmission lines T1'~Tn'. As for how the first control signal and the second control signal control the transistors M1~M4 of each voltage adapting device Di is elaborated below. However, the scope of the invention is not limited thereto.

Figure 6B:
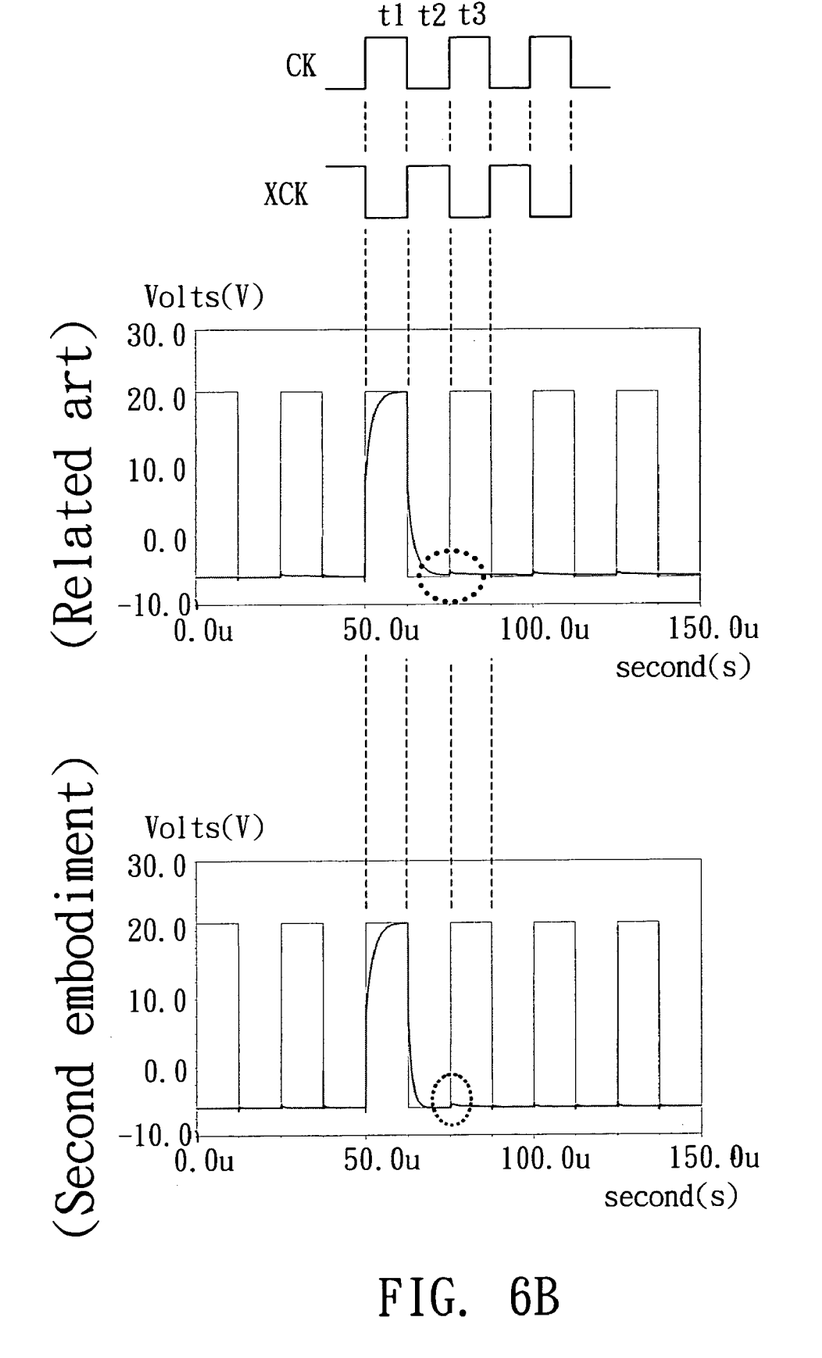
FIG. 6B shows a comparison diagram of the gate signal waveform according to the related art and the second embodiment of the invention.

Referring to FIG. 6B, a comparison diagram of the gate signal waveforms, according to the related art and the second embodiment of the invention, is shown. In the driving circuit 206, the $i^{th}$ shift register 206b, which corresponds to the gate line Gi, functions according to the clock signal CK. Meanwhile, the first control signal of the NMOS transistor M1 and the second control signal of the NMOS transistor M3 respectively corresponding to the gate line Gi are the clock signal XCK and clock signal CK respectively.

As shown in FIG. 5 and FIG. 6, during the first period t1, that is, within 12.5 microseconds (us), the clock signal CK is at a high level, the $i^{th}$ shift register 206b outputs the gate signal Si through a gate line Gi to enable the corresponding pixel row Ri. The timing controller 206a of the driving circuit 206 turns on the NMOS transistor M4 through the gate line Gi, thereby inputting the working voltage Vee to the gate of the NMOS transistor M2 to turn off NMOS transistor M2, and the NMOS transistor M3 is also turned off accordingly. Meanwhile, the timing controller 206a outputs the first control signal, that is, the clock signal XCK, to turn off the NMOS transistor M1. The $(i+1)^{th}$ shift register 206b provides the gate line G(i+1) with an output voltage according to the working voltage Vee to disable the corresponding pixel row Rj+1.

Next, during a second period t2, the clock signal CK corresponding to the second control signal of the NMOS transistor M3 coupled to the gate line Gi is at low level, and the driving circuit 206 turns off the corresponding NMOS transistor M3 and NMOS transistor M2 according to the clock signal CK. Meanwhile, the first control signal XCK turns on the NMOS transistor M1 coupled to the gate line Gi and outputs the working voltage Vee to the gate line Gi. Meanwhile, the NMOS transistor M4 is turned off.

Afterwards, during a third period t3, the first control signal XCK corresponding to the gate line Gi turns off the corresponding NMOS transistor M1. Meanwhile, the second control signal CK outputted by the timing controller 106a is at high level and turns on the NMOS transistor M3 and the NMOS transistor M2 both corresponding to the gate line Gi, thereby inputting the working voltage Vee to the gate line Gi. Meanwhile, the NMOS transistor M4 is turned off.

By doing so, according to the related art shown in FIG. 6B, the gate delay time equals 3.21 us, and the magnitude of the circled ripples equals 0.62V. According to the second embodiment of the invention shown in FIG. 6B, the gate delay time equals 1.76 us, and the magnitude of the circled ripples equals 0.44V. That is, according to the design of the invention, during the second period t2, the gate delay occurring to the gate signal Si inputted during the first period t1 is accompanied by mitigated distortion, because the working voltage Vee outputted by the turned-on NMOS transistor M1 is promptly dropped to an output level of the working voltage. Moreover, the ripples which start to occur during the second period t2 are also decreased. The second control signal CK is outputted to the NMOS transistor M3 of corresponding voltage adapting device 208 through the transmission line Ti' disposed outside the pixel matrix 204, so that the aperture ratio is not affected. Within the display time of one frame, the first control signal XCK and the second control signal CK turn on the NMOS transistor M1 and the NMOS transistor M2 respectively and alternately to continuously output the working voltage, thereby largely decreasing the ripples. Therefore, the invention is capable of reducing the gate delay issue without affecting the aperture ratio and is capable of alternately outputting the working voltage Vee to the corresponding gate line through the NMOS transistor M1 and the NMOS transistor M2 to decrease the ripples occurred in related art.

However, any one who is skilled in the art to which the invention pertains will understand that the scope of the invention is not limited to the two embodiments disclosed above. For example, the driving circuit 206 can be disposed on the substrate 202, and the shift registers 206b of FIG. 2 can be disposed on the substrate 202; or the driving circuit 206 can output the first control signal through the first transmission lines T1~Tn correspondingly coupled to the shift register 206. Meanwhile, the first control signal coupled to the first switch corresponding to the gate line Gi is coupled to an output signal of the $(i+1)^{th}$ shift register 206b of the next gate line G(i+1). Any design which uses the voltage adapting device to output a high-level or a low-level working voltage to achieve the object of reducing gate delay issue or decreasing ripples without affecting the aperture ratio is within the scope of the invention.

According to the flat display structure and method for driving the flat display disclosed in the above embodiments of the invention, the driving circuit outputs a control signal through the transmission lines disposed on some area of the substrate other than the pixel matrix to control the voltage adapting device to output a working voltage so as to achieve the object of reducing gate delay issue without affecting the aperture ratio. Moreover, the voltage adapting device is capable of outputting the duty cycle of the working voltage according to actual needs, so as to effectively decrease ripples and largely improve the display quality of display panel.

While the invention has been described by way of example and in terms of two preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A flat display structure, comprising:
a substrate;
a plurality of gate lines $G_i$, where i=1 to n, and a plurality of data lines disposed on the substrate, wherein the gate lines and data lines together form a pixel matrix having a plurality of pixel rows $R_i$ where i=1 to n;
a plurality of voltage adapting devices $D_i$, where i=1 to n, disposed on the substrate, wherein the i-th voltage adapting device $D_i$ comprises:
an input terminal electrically connected to a first end of the i-th gate line $G_i$ corresponding to the i-th pixel row $R_i$;
a first control terminal; and
an output terminal adapted to receive a working voltage; and
a driving circuit electrically connected to the gate lines, wherein the driving circuit comprises:
a plurality of shift registers, respectively coupled to second ends of the gate lines, to provide a plurality of gate signals to the second ends of the gate lines; and
a timing controller electrically connected to the first control terminals, to provide a plurality of first control signals to the first control terminals, wherein the first control signal applied to the j-th voltage adapting device $D_j$ and the first control signal applied to the (j+1)-th voltage adapting device $D_{j+1}$ are in opposite phase, and each of the first control signals is at a frequency which is larger than frequency of the gate signals.

2. The flat display structure according to claim 1, wherein the flat display structure further comprises:
a plurality of transmission lines disposed on the substrate outside the pixel array and coupled between the timing controller and the first control terminals of the voltage adapting devices.

3. The flat display structure according to claim 1, wherein the first control signal applied to the j-th voltage adapting device $D_j$ and the first control signal applied to the (j+1)-th voltage adapting device $D_{j+1}$ are out of phase and have same frequency.

4. The flat display structure according to claim 3, wherein the first control signal applied to the j-th voltage adapting device $D_j$ and the first control signal applied to the (j+2)-th voltage adapting device $D_{j+2}$ are in phase and have same frequency.

5. The flat display structure according to claim 1, wherein the i-th voltage adapting device $D_i$ comprises a first switch having:
a source electrically connected to the i-th gate line $G_i$;
a drain adapted to receive the working voltage; and
a gate adapted to receive the first control signal.

6. The flat display structure according to claim 1, wherein the i-th voltage adapting device $D_i$ further comprises a second control terminal adapted to receive a second control signal.

7. The flat display structure according to claim 6, wherein the
timing controller further provides the second control signal.

8. The flat display structure according to claim 6, wherein the i-th voltage adapting device $D_i$ comprises:
a first switch having:
a source electrically connected to the i-th gate line $G_i$;
a drain adapted to receive the working voltage; and
a gate adapted to receive the first control signal;
a second switch having:
a source electrically connected to the i-th gate line $G_i$;

a drain adapted to receive the working voltage; and
a gate;
a third switch having:
a source adapted to receive the second control signal;
a drain electrically connected to the gate of the second switch; and
a gate electrically connected to the source of the third switch; and
a fourth switch having:
a source electrically connected to the gate of the second switch;
a drain adapted to receive the working voltage; and
a gate electrically connected to the i-th gate line $G_i$.

9. The flat display structure according to claim 7, wherein the first control signal and the second control signal are out of phase and have same frequency.

10. The flat display structure according to claim 5, wherein the first control signal applied to the j-th voltage adapting device $D_j$ and the first control signal applied to the (j+1)-th voltage adapting device $D_{j+1}$ are out of phase and have same frequency.

11. The flat display structure according to claim 10, wherein the first control signal applied to the j-th voltage adapting device $D_j$ and the first control signal applied to the (j+2)-th voltage adapting device $D_{j+2}$ are in phase and have same frequency.

12. A method for driving a flat display, the flat display comprising a pixel matrix having a plurality of pixel rows $R_i$, where i=1 to n, the method comprising:
sequentially providing a first gate signal $S_j$ to a first end of the j-th pixel row $R_j$ and a first gate signal $S_{j+1}$ to a first end of the (j+1)-th pixel row $R_{j+1}$ according to a first clock signal and a second clock signal by a driving circuit, respectively, in a first display period, wherein the first clock signal and the second clock signal are out of phase and have same frequency;
providing a plurality of first control signals by the driving circuit to a second end of the j-th pixel row $R_j$ and a second end of the (j+1)-th pixel row $R_{j+1}$, respectively, wherein the first control signal to the j-th pixel row $R_j$ and the first control signal to the (j+1)-th pixel row $R_{j+1}$ are out of phase and have same frequency, and the first control signal to the j-th pixel row $R_j$ and the first clock signal are out of phase and have same frequency, wherein each of the first control signals is a clock signal and substantially larger than the first gate signals in frequency; and
providing a working voltage to the j-th pixel row $R_j$ and the (j+1)-th pixel row $R_{j+1}$, wherein the first gate signal is adjusted according to the first control signal and the working voltage.

13. The method according to claim 12, further comprising providing a second control signal to the j-th pixel row $R_j$ and the (j+1)-th pixel row $R_{j+1}$, wherein the first control signal and the second control signal are out of phase and have same frequency.

14. The method according to claim 12, further comprising providing the first control signal to the (j+2)-th pixel row $R_{j+2}$, wherein the first control signal to the j-th pixel row $R_j$ and the first control signal to the (j+2)-th pixel row $R_{j+2}$ are in phase and have same frequency.

15. A flat display structure, comprising:
a substrate;
a plurality of gate lines $G_i$, where i=1 to n, and a plurality of data lines disposed on the substrate, wherein the gate lines and data lines together form a pixel matrix having a plurality of pixel rows $R_i$, where i=1 to n;
a driving circuit to provide a plurality of first control signals and a plurality of gate signals, electrically connected to first ends of the plurality of gate lines to provide the gate signals at first ends of the gate lines, wherein the first control signals are clock signals larger than the first gate signals in frequency; and
a plurality of voltage adapting devices $D_i$, where i=1 to n, disposed on the substrate, wherein the i-th voltage adapting device $D_i$ comprises:
an input terminal electrically connected to a second end of the i-th gate line $G_i$ corresponding to the i-th pixel row $R_i$;
a first control terminal to receive a corresponding one of the first control signals, wherein the corresponding first control signal applied to the j-th voltage adapting device $D_j$ and the corresponding first control signal applied to the (j+2)-th voltage adapting device $D_{j+2}$ are in phase and have same frequency; and
an output terminal adapted to receive a working voltage.

16. The flat display structure according to claim 15, wherein the flat display structure further comprises:
a plurality of transmission lines disposed on the substrate outside the pixel array and coupled between the timing controller and the first control terminals of the voltage adapting devices.

17. The flat display structure according to claim 15, wherein the driving circuit provides the first control signals at a pulse repetition frequency larger than the gate signals so as to control the voltage adapting devices.

18. The flat display structure according to claim 1, wherein the timing controller provides the first control signals at a pulse repetition frequency larger than the gate signals so as to control the voltage adapting devices.

19. The method according to claim 12, wherein the flat display is based on a substrate, and the first control signals of the driving circuit are provided to the second end of the j-th pixel row $R_j$ and the second end of the (j+1)-th pixel row $R_{j+1}$ via a plurality of transmission lines disposed on the substrate outside the pixel matrix.

20. The method according to claim 12, wherein the first control signals of the driving circuit provided to the second end of the j-th pixel row $R_j$ and the second end of the (j+1)-th pixel row $R_{j+1}$ are at a pulse repetition frequency larger than the gate signals.

* * * * *